United States Patent [19]

Patterson et al.

[11] 4,352,714
[45] Oct. 5, 1982

[54] METHOD FOR MAKING A METAL-TO-CERAMIC INSULATOR SEAL FOR ELECTROCHEMICAL CELLS

[75] Inventors: Charlton A. Patterson, Parma Heights; Richard M. Wilson, Medina, both of Ohio

[73] Assignee: Union Carbide Corporation, Danbury, Conn.

[21] Appl. No.: 192,018

[22] Filed: Sep. 29, 1980

[51] Int. Cl.$^3$ ................... H01M 2/08; C03C 17/10; C03C 29/00
[52] U.S. Cl. .................. 156/626; 156/632; 156/634; 174/152 GM; 228/124; 361/433; 403/272; 403/404; 429/174; 429/181; 429/185
[58] Field of Search ............ 156/630, 632, 634, 626, 156/656, 643; 174/50.61, 152 GM; 228/120, 122, 124, 263 A, 903; 429/174, 181, 185; 403/29, 30, 28, 272, 404; 361/433; 204/16, 37 R, 192 R

[56] References Cited

U.S. PATENT DOCUMENTS

| 3,203,787 | 8/1965 | Grunwald | 156/656 X |
| 3,532,283 | 10/1970 | Kawata | 242/55.19 R |
| 3,646,405 | 2/1972 | Wallis et al. | 361/433 |
| 4,127,702 | 11/1978 | Catanzarite | 429/56 |
| 4,167,413 | 9/1979 | Christ | 156/634 X |

OTHER PUBLICATIONS

Ceramic Bulletin, "A Survey of Ceramic-To-Metal Bonding", vol. 38, No. 6, (1959), G. R. Van Houten, pp. 301-307.
The Electrochemical Society, Inc., "Modern Electroplating", Edited by F. A. Lowenheim, John Wiley & Sons, Inc., pp. 260-264.
"Electroless Plating Baths", by Dr. Juan Hajdu, pp. 485-493, Enthone, Inc., New Haven, Conn.
"Ceramic-To-Metal Bonding", by Claes I. Helgesson, Boston Technical Publishers, Inc., Cambridge, Mass., 1968, pp. 10-20.
J. Electrochemical Society, May 1975, "The Direct Bonding of Metals To Ceramics by the Gas-Metal Eutectic Method", J. F. Burgess et al., pp. 688-689.
Machine Design, vol. 39, May 1967, "Metallizing Ceramics", Robert F. Karlak, pp. 161-165.
Metal Finishing, 47th Guidebook-Directory Issue 1979, vol. 77, No. 13, "Barrel Plating", by F. J. LaManna, p. 398.

Primary Examiner—William A. Powell
Assistant Examiner—Thomas Bokan
Attorney, Agent, or Firm—Cornelius F. O'Brien

[57] ABSTRACT

A method for metallurgically bonding a ceramic element to a metal member to produce a seal for electrochemical cells whereby the ceramic element is first plated with a metal that can be chemically removed prior to or subsequent to the bonding of the components together using a fusible metal.

5 Claims, 1 Drawing Figure

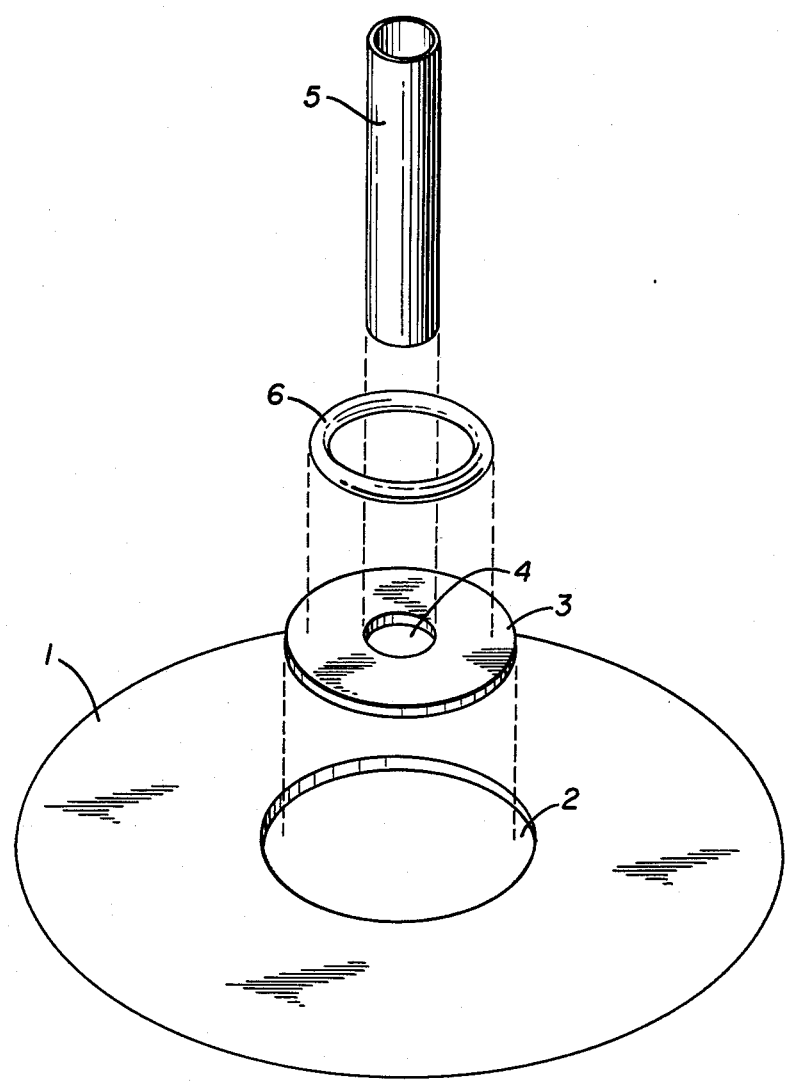

METHOD FOR MAKING A METAL-TO-CERAMIC INSULATOR SEAL FOR ELECTROCHEMICAL CELLS

FIELD OF THE INVENTION

The invention relates to a method for metallurgically bonding a ceramic insulator to a metal member to produce a seal for electrochemical cells whereby the ceramic insulator is plated with a metal that can be chemically removed subsequent to the bonding operation so that the plated metal on selected exposed surfaces of the ceramic insulator can be chemically removed after the fusible metal bond is formed.

BACKGROUND OF THE INVENTION

The joining of ceramics to metals is of ever increasing importance. Metal-ceramic bonding has already received considerable attention for such varied applications as cutting tools and electronic tubes. More recently, metal-ceramic bonding has found utility in the fabrication of closure seals for electrochemical cells so as to render the cells fluid-tight.

Conventionally, metallurgical bonding of metal members to ceramic members first required the ceramic part to be precoated with a metal which usually involves the sintering of an oxide of a metal on the ceramic surface with a subsequent reduction of the surface layer to metal, or the sintering of a metal powder on the ceramic surface. The reason for metallizing the ceramic surface is to prepare the surface for brazing or soldering the plated metal to another metal to produce a strong fluid-tight assembly. Since sintering requires the use of high temperature environments, care has to be taken not to distort or otherwise destroy the physical properties of the ceramic member.

Once a fusible metal joint is formed between the metal-plated ceramic member and the metal member by soldering or brazing techniques, the exposed area of the ceramic member still has a layer of the plated metal. In certain applications this may be acceptable, but when the part is intended to be employed in electronic tubes or as seals for electrochemical cells, then the plated metal will have to be removed from selected areas of the ceramic part so as to destroy any electronic paths between the joined members which could cause electrical shorting. Conventionally, the unwanted plated metal areas are removed from the ceramic part prior to soldering or brazing by a grinding operation which is cumbersome to perform and expensive when small ceramic parts are involved. Additionally, when a small ceramic insulating annulus or ring is to be metallurgically bonded to a metal member at its outer peripheral area and to a second metal member at its inner circular area, when two brazing or soldering rings are required - one for each fusible metal joint to be formed. This type of metal-to-ceramic-to-metal bonding is usually required for metal/ceramic seals for use in electrochemical cells. Not only is the fabrication of these seal assemblies expensive, but due to the small size of the overall assemblies, it is difficult to insure the forming of good fusible metal joints on a continuous and reliable basis.

One object of the present invention is to provide a method for metallurgically bonding a metal-plated ceramic insulator to a metal member whereby the plated metal on selected areas of the ceramic part can be chemically removed.

Another object of the present invention is to provide a method for metallurgically bonding a ceramic insulator annulus to a metal member at its peripheral edge and a metal member at its inner disposed edge using only one fusible metal ring.

Another object of the present invention is to provide a method for producing ceramic/metal seals for electrochemical cells such as oxyhalide cells.

Another object of the present invention is to provide a method for producing ceramic/metal seals for electrochemical cells that is relatively inexpensive to perform and consistent in its reliability to produce fluid-tight fusible metal joints.

SUMMARY OF THE INVENTION

The invention relates to a method for metallurgically bonding a ceramic insulator to a metal member comprising the steps:

(a) plating the surface of the ceramic insulator with a metal that can be chemically removed;

(b) juxtaposing the plated ceramic insulator and a metal member to be metallurgically bonded;

(c) placing a heat fusible metal proximal the areas of the metal-plated ceramic insulator and metal member to be metallurgically bonded;

(d) heating the fusible metal above its melting point and below the melting points of the metal-plated ceramic insulator and metal member so as to form a metallurgical bond between the metal-plated ceramic insulator and metal member; and (e) chemically treating the components of step (d) to remove the plated metal from selected exposed surfaces on the ceramic insulator while not destroying the metallurgically bonded joint.

As used herein, chemical removal shall also include electrochemical removal in accordance with the subject invention.

Preferably, the method for plating the surface of the ceramic insulator could be an electroless plating technique as generally disclosed in U.S. Pat. Nos. 2,829,059, 2,532,284, 2,874,072, 3,123,484, and 2,827,398. Electroless plating is a chemical plating method not involving the use of applied electrical power and is sometimes called "autocatalytic" plating because a material is employed on the surface to be plated which serves as a catalyst for the reduction of the metal ions in solution by a chemical reducing agent also contained in the plating solution along with a salt of the metal to be plated as disclosed in Metal Finishing, 47th Guidebook - Directory Issue, Metals and Plastics Publications, Inc., New Jersey, 1979, pp 485-493. The chemical reducers commonly employed are sodium hypophosphite, formaldehyde, sodium borohydride and aminoboranes. The electroless baths are so formulated that the metal salt and the reducer will react only in the presence of a catalyst. In preparing the ceramic part for plating, the surface should be first sensitized to react with a metal salt and then activated with the metal salt prior to plating.

The metal to be plated on the ceramic members has to be one that can be chemically removed such as nickel, zinc, cadmium, chromium or the like. This is necessary to prevent any electronic paths across the ceramic member when the metallurgically bonded assembly is intended for use as parts in electronic or electrochemical applications. The use of such plated metals will eliminate the need for any grinding techniques for removal of the metal from the ceramic surfaces. In addition, since the plated metal need not be removed until after the metallurgical bond is produced, it is possible to minimize the number of fusible metal members required when the ceramic element is being bonded to more than one metal member. As stated above, the method of this invention is ideally suited for bonding small ceramic members to metal parts which can be employed as seals for electrochemical cells.

The fusible metal for use in the subject method can be lead-tin, lead-tin-cadmium or the like (soldering alloys) or alloys of copper and zinc or silver (brazing material) or any other material that can produce a fusible bond or joint between two metal surfaces.

In a preferred embodiment of this invention the surfaces of a ceramic insulator having flat surfaces are sensitized by immersion for about 1 to 5 minutes in an aqueous stannous chloride ($SnCl_2$) solution having a concentration of about 16 grams $SnCl_2$ per liter. The ceramic insulator is washed with water to remove excess $SnCl_2$. The ceramic surfaces are then activated by immersion for about 1 to 5 minutes in an aqueous palladium chloride ($PdCl_2$) solution having a concentration of about 1.0 grams $PdCl_2$ per liter. The ceramic insulator is washed with water to remove excess $PdCl_2$ and also to remove the stannic chloride ($SnCl_4$) which formed during the activation step. An electroless nickel plating bath is preferably prepared by first dissolving 24 grams of $NiCl_2.6H_2O$ in 600 ml water, slowly adding with stirring 120 ml aqueous concentrated (29 weight %) $NH_4OH$ solution and then diluting to 800 ml with water to form a plating bath; separately dissolving 6 grams of $NaBH_4$ in a solution of 120 ml water and 80 ml concentrated $NH_4OH$ solution to form a second solution; and then adding 20 ml of the second solution to the plating bath with initial stirring and adding the remainder of the second solution dropwise throughout the plating cycle of about 30 minutes to avoid decomposition of the bath. The ceramic insulator is plated by immersion in the plating solution which is contained in a rotating barrel placed in a 40° C. water bath. Approximately 40 grams of ceramic insulators (about 400 pieces; 0.2 inch outer diameter, 0.03 inch inner diameter and 0.03 inch thick) can be plated per liter of plating bath. When the ceramic insulator surface looks metallic, plating is considered complete. The plated ceramic insulator is washed with water to remove excess plating solution and then air-dried or oven-dried, for example, at about 100° C. The plated ceramic insulator is then juxtaposed a metal member to which it is to be metallurgically bonded. A fusible metal such as a braze filler metal, preferably silver, in the form of a suitable shape depending on the joint to be bonded, is deposited on the top flat surface of the ceramic insulator. The ceramic insulator and metal member assembly is brazed together by heating the entire assembly to a temperature sufficient to melt the filler metal and cause the melted filler metal to flow over the surface of the ceramic insulator and be drawn by capillary action into the interfacial areas between the metal member and the ceramic insulator. The brazed assembly is then acid-treated with, for example, nitric acid, $HNO_3$, immersion in the acid for a sufficient amount of time to dissolve the metal from selected exposed surfaces of the ceramic insulator without breaking the metal-to-ceramic seal. Care should be taken to insure that the acid treatment is not too long which could result in removal of some of the metal from the seal area thus weakening or even breaking the seal. Removal of the metal from the exposed ceramic insulator surfaces provides a non-conductive region between the metal member and the exposed surface on the ceramic insulator. The acid-treated assembly can thereafter be washed with water to remove excess acid and then dried in air or oven-dried at, for example, 100° C. The assembly so produced will have a good metallurgical bond.

Prior to the sensitizing step, the ceramic insulator may be optionally etched. The choice of etching or not to etch depends mainly on the joint strength which is desired. Etching generally results in a strong bonded joint since etching roughens the ceramic surface. For electrochemical applications, a stronger bond will result in a higher seal rupture strength (pressure) which may be too high for some applications. If etching is desired, the ceramic insulator is immersed in an etching solution, such as an aqueous solution containing 360 milliliters of 48% HF per liter and 170 milliliters of 70% $HNO_3$ per liter for about two minutes. Other etching solutions selected by those skilled in the art may also be used. After the ceramic insulator is etched, it is rinsed in water or other solvents to remove any excess etching solution. This can be performed by agitating the parts in the rinse water with periodic changes of the water or in running tap water, preferably until the pH of the effluent solution is at least about pH 6.

Before the sensitizing step, but after the optical etching procedure if it is performed, the ceramic insulator may optionally be treated with a surfactant to insure good wetting of the ceramic insulator surfaces during subsequent operations. A "Udique X-864" solution, a proprietary surfactant solution from Oxy-Metal Industries, has been found satisfactory, but others selected by those skilled in the art may be used. If the ceramic insulator is treated with the surfactant, the ceramic insulator should be washed in water to remove excess surfactant solution before subsequent treatment steps.

The aqueous sensitizing solution can have a concentration in the range of from about 2 to about 35 grams $SnCl_2$ per liter, preferably about 16 grams per liter. The ceramic insulator should be treated for about 1 to about 5 minutes depending on the concentration of the sensitizing solution. During the sensitizing step $Sn^{+2}$ ions are adsorbed on the ceramic insulator surface. Other sensitizing materials can be used, but they must be capable of being adsorbed on the ceramic insulator surface and capable of reducing, for example, palladium ion and ending up as a soluble product capable of being water-washed away.

The aqueous activating solution can have a concentration in the range of from about 0.1 to about 5.0 grams $PdCl_2$ per liter, preferably about 1.0 gram per liter. The ceramic insulator should be treated for about 1 to 5 minutes depending on the concentration of the activating solution. During the activating step, the $Pd^{+2}$ ion reacts with the $Sn^{+2}$ ion adsorbed on the ceramic surfaces according to the following reaction:

$$Sn^{+2} + Pd^{+2} \rightarrow Sn^{+4} + Pd°$$

The Pd metal formed on the ceramic surfaces then serves as a catalyst for the subsequent electroless Ni plating step.

The aqueous electroless nickel plating solution comprises $NiCl_2.6H_2O$ in a concentration in the range of from about 6 to about 100 grams per liter, preferably about 24 grams per liter, $NH_4OH$ (29 weight percent solution) in a concentration in the range of from about 50 to about 500 milliliters per liter, preferably about 200 milliliters per liter, and NaBH₄ in a concentration in the range of from 1.5 to about 15 grams per liter, preferably about 6 grams per liter. Electroless nickel plating can be performed at about 40° C. At much higher temperatures, the plating bath may decompose.

Metals other than nickel (or metal alloys) may be used to plate the ceramic insulator prior to the metal fusing step, e.g., cadmium, zinc or chromium. The metal selected should be one which is more active than hydrogen and must be chemically removable in some way, e.g., by immersing the metal-coated member in an aqueous acid solution such as $HNO_3$ which will dissolve the metal. The metal should also be one which is stable in the environment in which the bonded assembly is to be used, since a small amount of the metal remains in the finished bonded joint. Zinc, for example, would not be suitable for metal/ceramic seals to be used in oxyhalide cells, since it would be readily attacked by the highly corrosive oxyhalide solutions, resulting in eventual destruction of the bonded joint of the seal. However, zinc could presumably be used to prepare metal/ceramic seals for use in solid electrolyte cells where the primary reason for employing a hermetic seal might be to keep moisture out rather than to contain corrosive or harmful cell components.

The preferred method of applying the chemically removable metal coating on the ceramic insulator is electroless plating. Methods of applying the metal coating other than the preferred electroless plating method might include vapor deposition, sputtering (application of the metal to a surface in vacuum) or electroplating. For example, Ni may be plated from the well-known Watts bath. Barrel plating, which is a particular method of electroplating employing a tumbling or rotating barrel containing the plating bath and the parts to be plated, may be employed.

Brazing is the preferred method for forming the metal-to-ceramic seal. Pure silver is the preferred braze filler metal, but silver alloys such as an Ag-Cu eutectic containing 72% Ag and 28% Cu have also been found to be satisfactory. Other braze filler metals or alloys can be used if found compatible with the environment in which the bonded joint will be employed. Although pure copper or copper alloys can be used, copper would not be used with oxyhalide cell systems because it is not compatible with liquid oxyhalides. However, copper coated with lead might be used in an oxyhalide cell system. Soldering can be used to form the metal-to-ceramic seal if a compatible metal or alloy solder of sufficient is used. Pure lead is generally too soft and does not have enough strength to maintain a good strong fluid-tight bond.

In addition to the acid stripping solutions, which are preferred in the subject method for use with the plated coatings, it is believed that aqueous alkaline solutions could also be employed depending on the metal selected for the coated layer.

BRIEF DESCRIPTION OF THE DRAWING

The FIGURE shows an exploded view of an annular ceramic insulator prior to being metallurgically bonded to a metal cover at its peripheral edge and a metal pin at its inner disposed edge.

DESCRIPTION OF ONE EMBODIMENT OF THE INVENTION

As shown in the FIGURE, a stainless steel electrochemical cell cover 1 has as opening 2 adapted to receive a metallic tube 5, which functions as an electrode terminal and optionally as an electrolyte filling tube. After the ceramic insulator is plated as described above, it is positioned into opening 2 in cover 1 and tube 5 is positioned in its opening 4. A ring of a fusible metal 6, such as silver, is placed on top of the plated ceramic insualtor 3. The assembly is then heated above the melting temperature of fusible metal 6 whereupon the metal 6 will flow over the surface of the plated ceramic member 3 and be drawn by capillary action into the interfacial areas of the cover 1 and plated ceramic member 3 and the metallic tube 5 and plated ceramic member 3. The assembly is then acid-treated to dissolve the plated metal from the exposed surfaces of ceramic member 3 thereby providing a non-conductive region between the metal cover 1 and the metallic tube 5. This assembly is ideally suited for use as a metal/ceramic seal for electrochemical cells employing liquid cathodes such as oxyhalide cells. After the solid components are assembled into the container of a cell which is then closed by conventional means at its open end by this cover assembly, the liquid components of the cell could be added through the filler tube. Thereafter, the metallic tube could be sealed producing an overall effective fluid-tight closure for the cell employing the metal/ceramic seal made using the method of this invention.

Metal-to-ceramic seals produced by the method of the present invention can be tested for leakage by a dye penetration test or a helium leak test.

The primary test for the quality of the seal is a dye penetration test in which a dye solution (containing a very volatile solvent) is placed, e.g., by spraying, on one side of the cover containing the hermetic seal and a developer in liquid form is placed on the opposite side. The developer will penetrate any leakage paths in and around the seal and will cause a door change in the dye deposit on the first side which is readily observed. It has been found that 93–96% of seals produced according to the present invention, and as basically shown in the FIGURE, revealed on evidence of leakage.

The seals, after being brazed into the cell covers, can also be tested by means of a helium leak test. It has been found that typical seals made according to this invention will pass only $10^{-7}$ to $10^{-8}$ cc of helium per second at a pressure of 100 psig.

The metal-to-ceramic seals made according to the method of this invention can be used in any electrochemical cell or device but are especially useful for nonaqueous cell systems where a hermetic seal is a necessity. For example, this seal can be used in cells containing thionyl chloride and/or sulfuryl chloride as the liquid active cathodic material in conjunction with a lithium metal anode.

Although the present invention has been described and set forth in some detail, it should be further understood that the same is susceptible of changes, modifications and variations without departing from the scope and spirit of the invention.

What is claimed is:

1. A method for making a metal/ceramic seal for electrochemical cells comprising the steps:

(a) plating the surface of a ceramic insulator having an opening disposed in the insulator with a metal that can be chemically removed;

(b) juxtaposing a metal elongated member at the opening of the metal-plated ceramic insulator such that the elongated member is to be metallurgically bonded within said opening and to said metal-plated ceramic insulator and juxtaposing the metal-plated ceramic insulator with a metal member to be metallurgically bonded together;

(c) placing a heat-fusible metal proximal the areas of the metal-plated ceramic insulator and metal elongated member and the metal-plated ceramic insulator and the metal member;

(d) heating the fusible metal above its melting point so as to cause the fusible metal to flow over the surface of the metal-plated ceramic insulator and be drawn by capillary action into the interfacial areas of the metal elongated member and the metal-plated ceramic insulator and the metal-plated ceramic insulator and the metal member; and (e) chemically treating the components of step (d) to remove the plated metal from selected exposed surfaces on the ceramic insulator while not effectively weakening the metallurgical bonds between the metal elongated member and the metal-plated ceramic insulator and between the metal-plated ceramic insulator and the metal member.

2. The method of claim 1 wherein the plating in step (a) the electroless plating.

3. The method of claim 1 or 2 wherein the metal to be plated is selected from the group consisting of nickel, zinc, cadmium and chromium.

4. The method of claim 1 or 2 wherein the fusible metal in step (c) is selected from the group consisting of tin alloys, copper alloys, silver and silver alloys.

5. The method of claim 1 or 2 wherein the chemical treating in step (e) is performed using an acid.

* * * * *

UNITED STATES PATENT AND TRADEMARK OFFICE
CERTIFICATE OF CORRECTION

PATENT NO. : 4,352,714

DATED : October 5, 1982

INVENTOR(S) : Charlton A. Patterson & Richard M. Wilson

It is certified that error appears in the above-identified patent and that said Letters Patent is hereby corrected as shown below:

Column 3, line 61, after the word "$HNO_3$" add --by--.

Column 4, line 16, after the first occurrence of the word "immersed" delete "insulator is immersed".

Column 6, line 42, after the words "cause a" delete "door" and substitute therefor --color--.

Column 8, line 11, after the word "(a)" add --is--.

Signed and Sealed this

Fifth Day of April 1983

[SEAL]

Attest:

Attesting Officer

GERALD J. MOSSINGHOFF

Commissioner of Patents and Trademarks